Jan. 18, 1949.　　　　L. A. MAJNERI　　　　2,459,665
　　　　COMBINED RETRACTING AND BRAKING SYSTEM
Filed Dec. 26, 1944　　　FOR AIRCRAFT LANDING GEAR
　　　　　　　　　　　　　　　　3 Sheets-Sheet 1
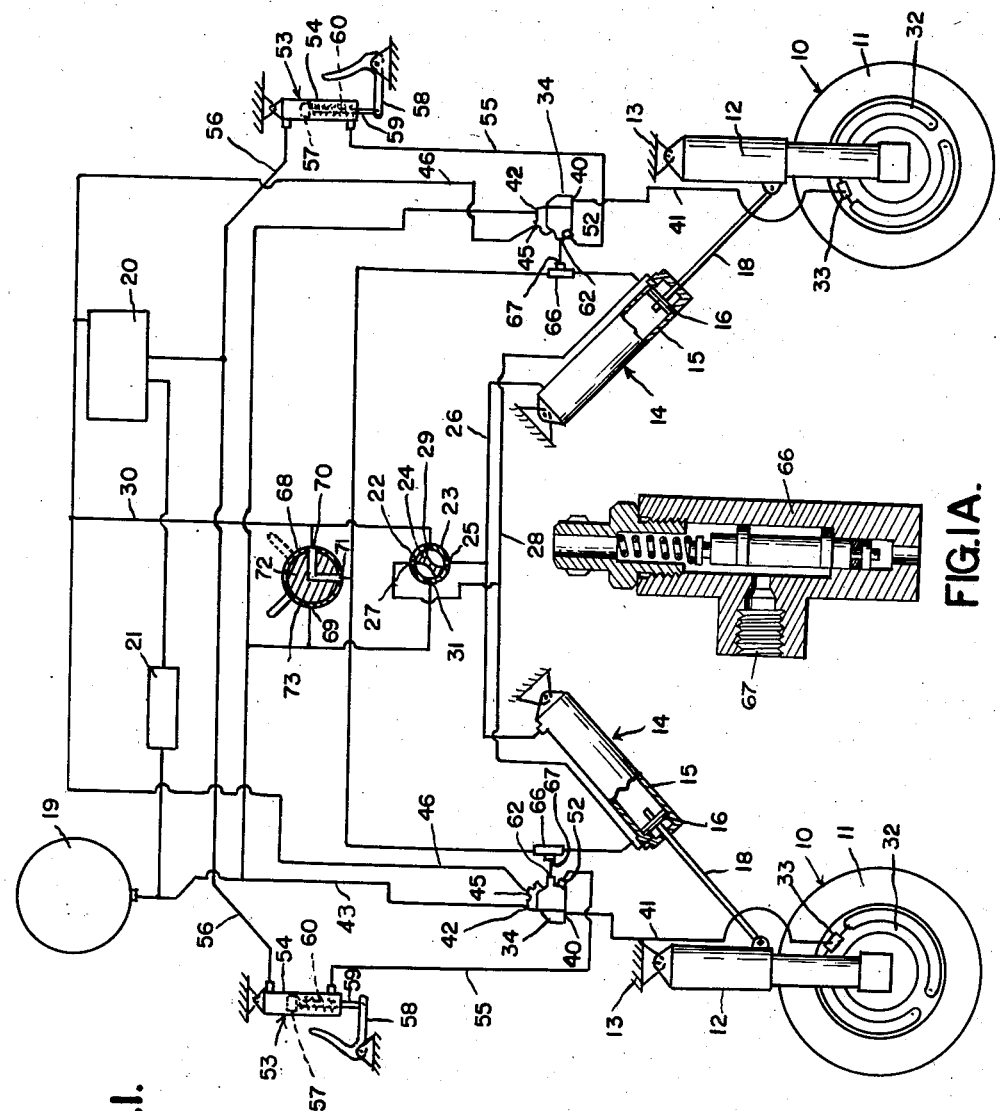
INVENTOR.
LUDWIG A. MAJNERI
BY
ATTORNEYS

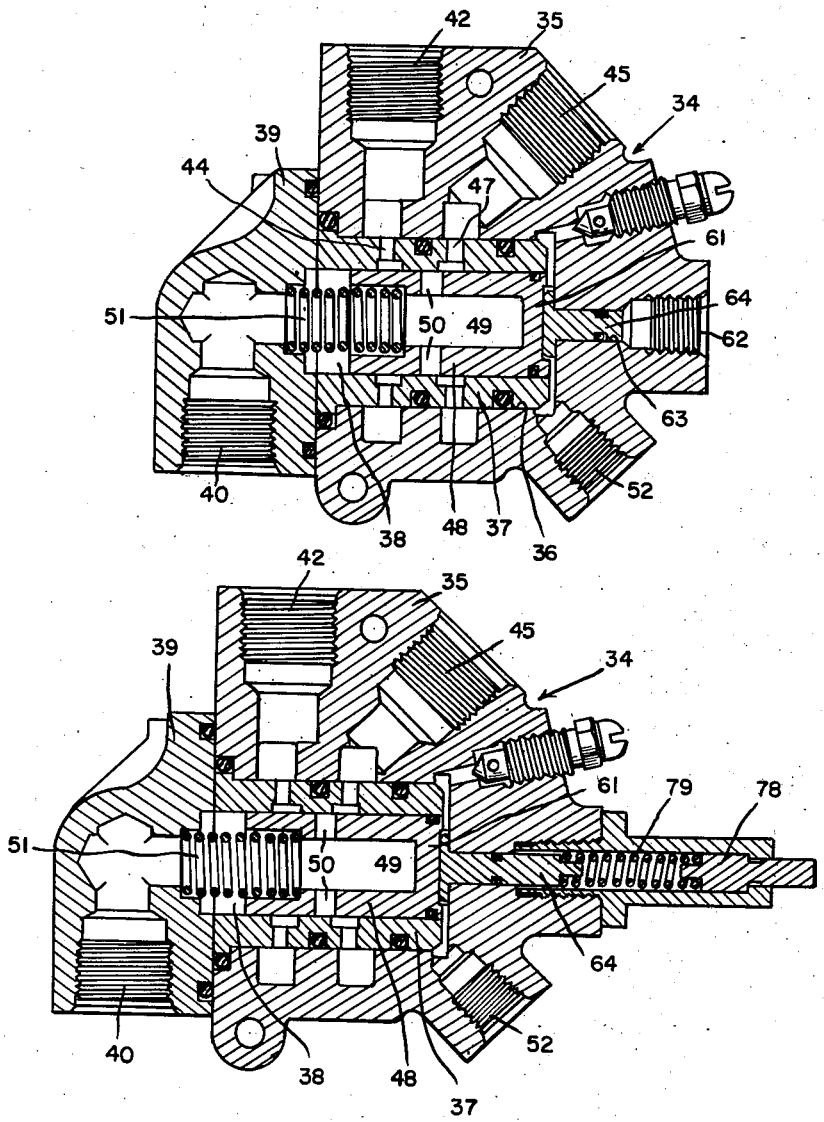

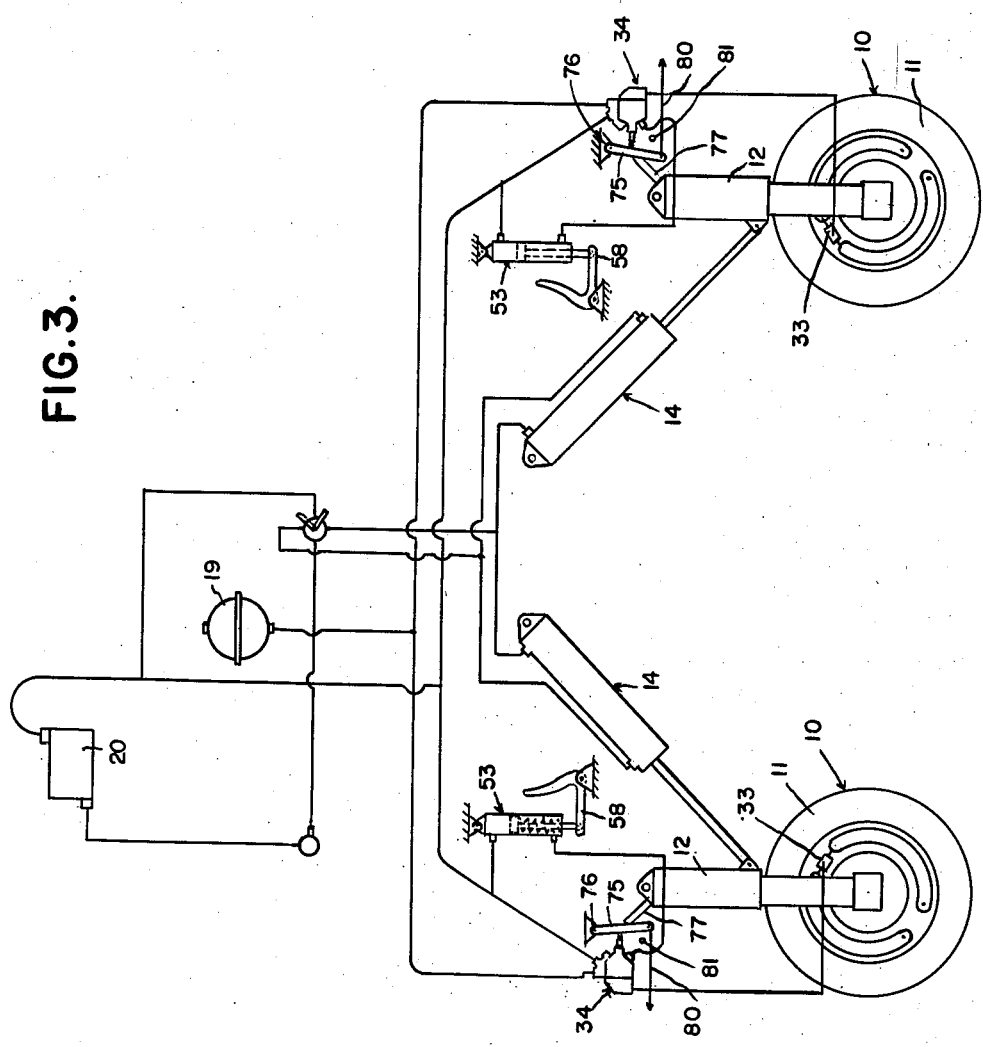

Patented Jan. 18, 1949

2,459,665

UNITED STATES PATENT OFFICE 2,459,665

COMBINED RETRACTING AND BRAKING SYSTEM FOR AIRCRAFT LANDING GEAR

Ludwig A. Majneri, Grosse Pointe, Mich., assignor to The Warner Aircraft Corporation, Detroit, Mich., a corporation of Michigan Application December 26, 1944, Serial No. 569,787

14 Claims. (Cl. 244—102)

1

This invention relates generally to aircraft and refers more particularly to aircraft equipped with retractable ground engaging wheels having brakes.

The ground engaging wheels of aircraft usually spin or rotate at a relatively high rate of speed as soon as they leave the ground and as a result a gyratory motion is set up which produces objectionable vibrations. The magnitude of such vibrations reaches substantial proportions in large aircraft where the ground engaging wheel units represent substantial weight, and it is an object of this invention to eliminate this source of vibration by providing means responsive to retracting movement of the ground engaging wheels to apply the brakes associated with the latter.

The ground engaging wheels of aircraft are also usually retracted by hydraulic mechanism and the brakes associated with the wheels are ordinarily operated by hydraulic actuators through the medium of manually operable control devices. Also, aircraft of the above general type is usually equipped with an accumulator containing a supply of fluid under relatively high pressure and adapted to be connected to the hydraulic brake actuators through the medium of pressure limiting valves which are independently operated to connect the accumulator to the brake actuators by the manually operable devices previously referred to. It is therefore another object of this invention to operate the limiting valves independently of the manually operable devices by the retracting gear for the ground engaging wheels to connect the hydraulic brake actuators to the accumulator.

Another object of this invention is to provide a hydraulic installation wherein the pressure limiting valve is operable independently of the manually operable device by fluid under pressure from the retracting device or from the accumulator to connect the latter to the hydraulic brake actuator.

A further object of this invention is to provide an arrangement wherein separate means other than the manually operable device is provided for selectively operating the limiting valve to connect the hydraulic brake actuator to the accumulator. As a result of this feature, the hydraulic brake actuator may not only be operated to apply the brake in the orthodox manner by manipulation of the manually operable device, but in addition may be independently operated by the retracting means and by means for applying the brake for parking purposes.

2

The foregoing, as well as other objects, will be made more apparent as this description proceeds, especially when considered in connection with the accompanying drawings wherein:

Figure 1 is a diagrammatic view of a hydraulic installation embodying the features of this invention; Figure 1A is a fragmentary sectional view through the shuttle valve shown in Figure 1;

Figure 2 is a longitudinal sectional view through a pressure limiting valve embodied in the system shown in Figure 1;

Figure 3 is a diagrammatic view of a modified hydraulic installation also embodying the features of this invention; and Figure 4 is a longitudinal sectional view through the pressure limiting valve embodied in the diagram shown in Figure 3.

The hydraulic installations shown in Figures 1 and 3 are particularly adapted for use in connection with aircraft of the type having retractable ground engaging wheels and having separate hydraulic braking systems for the ground engaging wheels.

With the above in view, reference is made to Figure 1 of the drawings wherein two ground engaging wheel units are indicated by the reference character 10. Both units are identical in construction and accordingly only one need be described in detail. As shown, each unit 10 comprises a ground engaging wheel 11 and a mounting 12 for rotatably supporting the wheel 11 from the aircraft. The mounting 12 is connected to the aircraft in any suitable manner to enable movement of the unit 10 from the operative position shown in Figure 1 to a retracted position. For the purpose of illustration, the upper end of the mounting 12 is shown as pivoted to a suitable support 13 in a manner to enable the unit 10 to be swung about the axis of the pivot to its retracted and operative positions.

In the present instance, each ground engaging wheel unit 10 is retracted by a hydraulic device 14 comprising a cylinder 15 and a piston 16 reciprocably mounted in the cylinder. The upper end of the cylinder is suitably pivoted to a support 17, and the piston 16 in the cylinder is connected to the mounting 12 by a rod 18. The rod 18 extends through the lower end of the cylinder for connection with the piston 16 and the lower end of the rod is pivoted to the mounting 12 intermediate the ends of the latter.

Each end of the cylinder 15 is adapted to be selectively connected to an accumulator 19 and to a reservoir 20. The accumulator 19 is supplied with hydraulic braking fluid under relatively high pressure by a pump 21 having the intake side communicating with the reservoir 20 and having the discharge side communicating with the accumulator. The hydraulic devices 14 are simultaneously operated to retract the ground engaging wheel units 10 by a manually operable valve 22. The valve 22 comprises a casing 23 and a valve member 24 supported in the casing 23 for rotation.

The casing 23 has a port 25 which communicates with the upper ends of the cylinders 15 through the medium of a conduit 26 and is provided with a diametrically opposed port 27 which communicates with the lower ends of the cylinders 15 through the medium of a conduit 28. In addition, the valve casing 23 has a port 29 intermediate the ports 25 and 27 and connected to the reservoir 20 through the medium of a conduit 30. A fourth port 31 is formed in the casing 23 diametrically opposite the port 29 and is connected to the accumulator 19 through the medium of a conduit 31'.

The above arrangement is such that when the valve member 24 is in the position thereof shown in Figure 1, the lower ends of the cylinders 15 are connected to the accumulator and the upper ends of the cylinders are connected to the reservoir 20. As a result, fluid under pressure from the accumulator moves the pistons 16 upwardly in their respective cylinders 15 to effect a corresponding swinging movement of the ground engaging wheel units upwardly to their retracted positions with respect to the aircraft.

When it is desired to return the ground engaging wheel units 10 to their operative positions shown in Figure 1, the valve 24 is rotated to connect the ports 27 and 29 and to connect the ports 25 and 31 in the valve casing. As a result, the lower ends of the cylinders 15 are connected to the reservoir 20 and the upper ends of the cylinders are connected to the accumulator 19. Accordingly, the ground engaging wheel units 10 are swung downwardly from the retracted positions to their operative positions.

The present invention concerns itself more particularly with means for stopping rotation of the wheels 11 as the latter are retracted by the hydraulic devices 14. In this connection it will be noted that each ground engaging wheel is provided with a hydraulic brake having friction means 32 and having a hydraulic actuator 33 supported between adjacent ends of the friction means for spreading the latter outwardly into engagement with their respective braking surfaces on the wheels 10.

In accordance with conventional practice, separate hydraulic braking systems are provided for each brake so that the latter may be independently operated. It will be noted from Figure 1 that both braking systems are identical, and therefore only one is described in detail. As shown, the flow of fluid under pressure to each hydraulic actuator 33 is regulated by a pressure limiting valve 34 shown in Figure 2 of the drawing. In detail, the valve 34 comprises a casing 35 having a bore 36 and having a sleeve 37 secured in the bore 36. The interior of the sleeve 37 forms a chamber 38 closed at one end by a cap 39 which is rigidly secured to the casing 35 and is provided with an outlet port 40 communicating with the chamber 38. The outlet port 40 is connected to the hydraulic actuator 33 by a conduit 41 and is adapted to be connected to an inlet port 42 in the casing 35. The inlet port 42 communicates with the accumulator 19 through the medium of a conduit 43 and communicates with the chamber 38 through radial ports 44. A second outlet port 45 is formed in the casing 35 and is connected to the reservoir 20 through the medium of a conduit 46. The outlet port 45 communicates with the chamber 38 through radial ports 47 spaced longitudinally of the chamber 38 from the ports 44.

The flow of fluid under pressure through the valve 34 is regulated by the valve member 48 supported in the chamber 38 for sliding movement and having a chamber 49 which is open at one end for communication with the chamber 38. As shown in Figure 2, the valve member 48 is also provided with radial ports 50 adapted to alternatively register with the ports 44 and 47 as the valve member 48 is moved in opposite directions. The valve member 48 is normally urged by a spring 51 to the position shown in Figure 2 wherein the ports 50 register with the ports 47. As a result, the outlet port 40 or the hydraulic brake actuator 33 is normally connected to the reservoir through the outlet port 45 in the valve 34.

The valve member 48 is moved against the action of the spring 51 to register the ports 50 with the ports 44 by fluid under pressure admitted to the chambers 38 through an inlet port 52 formed in the valve casing 35. Fluid under pressure is supplied to the chamber 38 through the inlet port 52 by means of a manually operable pressure producing device 53. The device 53 is in the form of a conventional master cylinder having a cylinder 54 connected at its lower end to the inlet port 52 by a conduit 55, and connected at its upper end to the reservoir 20 by a conduit 56. In accordance with conventional practice, a piston 57 is supported in the cylinder 54 for reciprocation and is connected to a pedal 58 by a rod 59.

With the construction thus far described, it will be noted that downward movement of the pedal 58 by the operator effects a corresponding downward movement of the piston 57 in the cylinder 54 against the action of the spring 60 and forces fluid under pressure into the chamber 38 through the inlet port 52. The fluid under pressure entering the chamber 38 from the inlet port 52 acts on the end 61 of the valve member 48 to move the latter against the action of the spring 51 to register the ports 50 with the ports 44. As a result, fluid under pressure from the accumulator 19 is permitted to flow through the valve 34 into the brake actuator 33 to apply the brake.

The pressure in the accumulator 49 usually exceeds the pressure required to apply the brake, and when this pressure in the chamber 38 exceeds a predetermined value the valve member 48 is moved to close the ports 44. In the event this pressure continues to rise above the desired value, the valve member 48 is moved sufficiently to register the ports 50 with the ports 47 and thereby connect the brake actuator 33 to the reservoir 20. Thus it will be seen that the valve member 48 moves back and forth in the chamber 38 to maintain a predetermined pressure in the brake actuator 33.

It will of course be understood that when the pedal 58 is released, the piston 57 in the master cylinder is moved upwardly by the spring 60 and the pressure in the chamber 38 acting on the end 61 of the valve member 48 drops sufficiently to enable return of the valve member by the spring 51 to the position shown in Figure 2 wherein the brake actuator 33 is connected to the reservoir 20 through the outlet port 45.

The brakes for the ground engaging wheels 11 are also applied by the hydraulic devices 14 when the latter are operated to retract the ground engaging wheel units 10. In this connection it will be noted that the lower end of each cylinder 15 is also connected to a third inlet port 62 formed in the casing 35 of the associated pressure limiting valve 34. Upon reference to Figure 2, it will be noted that the port 62 communicates with a passage 63 formed in the valve casing 35 opposite the closed end 61 of the valve member 48.

Thus it will be noted that when the valve 22 is in the position shown in Figure 1 to retract the ground engaging wheel units 10, fluid under pressure from the accumulator is also admitted to the inlet ports 62 in the two limiting valves 34. Inasmuch as this fluid is under the same pressure as the fluid admitted to the inlet ports 42 to operate the brake actuators 33, provision is made to reduce the force of the fluid acting on the closed ends 61 of the valve members 48. This is accomplished by providing a plunger 64 in each passage 63 between the inlet ports 62 and the ends 61 of the valve members 48. The cross sectional area of the plungers 64 is considerably less than the area of the valve members exposed to the fluid under pressure entering the chambers 38 through the inlet ports 42, and consequently the valve members 48 operate to regulate the flow of fluid pressure to the brake actuators in the same manner as previously described.

If desired, provision may also be made for applying the brakes for parking purposes. When this feature is incorporated, each braking system is provided with a shuttle valve 66 having the lower end communicating with the corresponding end of the cylinder 15 and having a port 67 intermediate the ends communicating with the inlet port 62 of the valve 34. The upper end of the shuttle valve 66 is adapted to be selectively connected to the accumulator 19 and the reservoir 20 by a valve 68. The valve 68 is shown in Figure 1 as having diametrically opposed ports 69 and 70 respectively communicating with the accumulator 19 and the reservoir 20. A third port 71 in the valve 68 communicates with the upper ends of the shuttle valves. In addition, the valve 68 has a rotatable valve member 72 provided with a passage 73 for selectively connecting the ports 69 and 70 to the port 71.

When the valve 68 is in the position thereof shown in Figure 1, the upper ends of the shuttle valves 66 are connected to the reservoir 20 so as to enable fluid under pressure from the lower ends of the cylinders 15 to flow through the shuttle valves into the pressure limiting valves 34. On the other hand, movement of the valve 68 to its parked position connects the ports 69 with the ports 71, or in other words, connects the accumulator to the upper ends of the shuttle valves 66. In this connection it will be understood that when the valve 68 is moved to its parked position, the valve 22 is in a position wherein the lower ends of the cylinders 15 are connected to the reservoir 20. Thus the shuttle valves 66 are operated by the accumulator pressure flowing through the valve 68 to admit fluid under pressure into the pressure limiting valves 34 to apply the brakes.

The embodiment of the invention shown in Figure 3 is similar to the first described form of the invention with the exception that the pressure limiting valves are mechanically operated in response to retraction of the ground engaging wheel units 10. Accordingly, corresponding parts of the present embodiment are indicated by the same reference characters employed in describing the first form of this invention. As shown in Figure 3, a lever 75 is positioned adjacent each of the mounting members 12. The upper end of each lever is supported for pivotal movement about a pin 76 and the levers are respectively swung in the direction of the arrows indicated in Figure 3 by cam members 77 projecting from the upper ends of the wheel mounting members 12. The pressure limiting valves 34 are respectively supported in the path of swinging movement of the levers 75 and are operated by the latter to connect the brake actuators 33 to the accumulator 19.

As shown in Figure 4, the pressure limiting valves 34 are practically identical to the valves shown in Figure 1 except for the fact that the plungers 64 are mechanically operated to move the valve members 48 to positions wherein communication is established between the accumulator and hydraulic brake actuators 33. In detail, each pressure limiting valve is provided with a second plunger 78 supported on the valve casing 35 for sliding movement in axial alignment to the plunger 64. A compression coil spring 79 is located between adjacent ends of the plungers, and this spring is sufficiently strong to transfer movement of the plunger 78 to the plunger 64. The purpose of the spring 79 between the two plungers is to permit the oscillation of the valve member 48 required to maintain a predetermined desired pressure in the brake actuator.

Thus, from the foregoing, it will be noted that movement of the ground engaging wheel units 10 to their retracted positions by the hydraulic actuators 14 engages the cams 77 with the levers 75 and swings the levers outwardly in the direction of the arrows shown in Figure 3. As the levers 75 swing outwardly they engage the plungers 78 on the pressure limiting valves 34 and operate the latter to connect the accumulator 19 to the hydraulic brake actuators. It will of course be understood that when the ground engaging wheel units are returned to their operative positions shown in Figure 3, the levers 75 are also returned by the return movement of the valve members 48.

The above construction also enables applying the brakes for parking purposes. As shown in Figure 3, the lower end of each lever 75 is connected to a cable 80 which in turn is connected to a suitable control not shown. The construction is such that movement of the cables in the direction of the arrows shown in Figure 3 operates the pressure limiting valves 34 to connect the accumulator to the hydraulic brake actuators for applying the brakes. If desired, the extent of swinging movement of the levers 75 to their respective brake applying positions may be limited by suitable stops 81 supported in the paths of swinging movement of the levers.

What I claim as my invention is:

1. A hydraulic brake installation for aircraft having a retractable ground engaging wheel, comprising a brake having a hydraulic actuator, a source of fluid under relatively high pressure, a valve between the hydraulic actuator and source of fluid under relatively high pressure, and means responsive to retracting movement of the ground engaging wheel for operating said valve to connect the hydraulic actuator to said source of fluid pressure supply for applying the brake.

2. A hydraulic brake installation for aircraft having a retractable ground engaging wheel, comprising a brake having a hydraulic actuator, a source of fluid under pressure, a pressure limiting valve between the source of fluid supply and hydraulic brake actuator, a manually operable pressure producing device for operating the valve to connect the source of fluid supply to the brake actuator, and means responsive to retracting movement of the ground engaging wheel for operating the valve independently of the manually operable device to connect the source of fluid supply to said hydraulic actuator.

3. A hydraulic brake installation for aircraft having a retractable ground engaging wheel, comprising a brake having a hydraulic actuator, a source of fluid under pressure, a valve between the source of fluid supply and hydraulic brake actuator, means for supplying fluid under pressure to the valve for operating the latter to connect the brake actuator to the source of fluid under pressure, means operable independently of the last named means to connect the valve to said source of fluid under pressure for operating the valve by the fluid under pressure from said source to connect the latter source of fluid to said hydraulic brake actuator, and means operable independently of both the aforesaid means in response to retracting movement of the ground engaging wheels to connect the source of fluid supply to said valve for operating the latter to supply fluid from the source to said hydraulic brake actuator.

4. A hydraulic installation for aircraft having a retractable ground engaging wheel, comprising a brake having a hydraulic actuator, a source of fluid under pressure, a reservoir for hydraulic braking fluid, means for retracting the ground engaging wheel including a cylinder, a piston in said cylinder connected to the ground engaging wheel, a valve for alternatively connecting opposite ends of the cylinder to the source of fluid under pressure and to said reservoir, and means responsive to movement of the piston in a direction to retract the ground engaging wheel to connect the source of fluid under pressure to said brake actuator.

5. A hydraulic installation for aircraft having a retractable ground engaging wheel, comprising a brake having a hydraulic actuator, a source of fluid under pressure, a valve between the source of fluid under pressure and the brake actuator for connecting the former to the latter to apply the brake, means for retracting the ground engaging wheel including a cylinder and a piston connected to the ground engaging wheel, means for connecting one end of the cylinder to the source of fluid under pressure for moving the piston in a direction to retract the ground engaging wheel, and means also connecting the latter end of the cylinder to said valve for operating the latter to connect the hydraulic brake actuator to the source of fluid under pressure.

6. A hydraulic installation for aircraft having a retractable ground engaging wheel, comprising a brake having a hydraulic actuator, a source of fluid under pressure, a reservoir for hydraulic braking fluid, a pressure limiting valve for connecting the source of fluid under pressure to the brake actuator to apply the brake, means for retracting the ground engaging wheel including a cylinder and a piston in the cylinder connected to the ground engaging wheel, a control valve for selectively connecting one end of the cylinder to the source of fluid under pressure and to said reservoir whereby in one position of the control valve the piston is moved by fluid under pressure to retract the ground engaging wheel and in another position of the valve the fluid under pressure in the cylinder is exhausted into the reservoir, a shuttle valve having one end connected to the end aforesaid of the cylinder and having an intermediate port connected to the pressure limiting valve for actuating the latter to connect the source of fluid under pressure to the hydraulic brake actuator, and a brake parking valve for selectively connecting the opposite end of the shuttle valve to the source of fluid under pressure and to said reservoir.

7. A hydraulic brake installation for aircraft having a retractable ground engaging wheel, comprising a brake having a hydraulic actuator, a source of fluid under pressure, fluid pressure operated mechanism for retracting the ground engaging wheel, and means responsive to the operation of said mechanism to retract the ground engaging wheel for connecting the actuator to the source of fluid under pressure.

8. A hydraulic brake installation for aircraft having a retractable ground engaging wheel, comprising a brake having a hydraulic actuator, a source of fluid under pressure, a pressure producing device, fluid pressure operated mechanism for retracting the ground engaging wheel, and a valve independently operable by said device and mechanism to connect the source of fluid under pressure to the brake actuator.

9. A brake installation for aircraft having a retractable ground engaging wheel, comprising a brake having a fluid pressure operated actuator, a pressure producing device for supplying fluid under pressure to the brake actuator to apply the brake, means for retracting the ground engaging wheel independently of the pressure producing device, and means responsive to retracting movement of the ground engaging wheel to supply fluid pressure to the actuator and thereby apply the brake independently of the pressure producing device.

10. A brake installation for aircraft having a retractable ground engaging wheel, comprising a brake having a fluid pressure operated actuator, a pressure producing device for supplying fluid under pressure to the brake actuator to apply the brake, means for retracting the ground engaging wheel independently of the pressure producing device, and means responsive to retracting movement of the ground engaging wheel to supply fluid pressure to the actuator and thereby apply the brake independently of the pressure producing device.

11. A brake installation for aircraft having a retractable ground engaging wheel, comprising a source of fluid under pressure, a brake having a fluid pressure operated actuator, a pressure producing device for supplying fluid under pressure to the brake actuator to apply the brake, a fluid motor for retracting the wheel independently of the pressure producing device, a valve for selectively connecting the fluid motor to said source of fluid under pressure, and means in the fluid connection between the valve and fluid motor for supplying fluid pressure to the actuator to apply said brake in response to retracting movement of the ground engaging wheel.

12. A brake installation for aircraft having a retractable ground engaging wheel, comprising a source of fluid under pressure, a brake having a fluid pressure operated actuator, a fluid motor for selectively retracting and extending the ground engaging wheel independently of the pressure producing device, means providing a fluid connection between the source of fluid under pressure and the fluid motor including a valve operable to control the flow of fluid under pressure to said fluid motor, and a fluid connection between he control side of the valve and said brake actuator.

13. A brake installation for aircraft having a retractable ground engaging wheel, comprising a source of fluid under pressure, a brake having a fluid pressure operated actuator, a pressure producing device having a fluid connection with the brake actuator for operating the brake, a fluid motor for retracting the ground engaging wheel independently of the pressure producing device, means providing a fluid connection between the source of fluid under pressure and the fluid motor including a valve operable to control the flow of fluid from said source to said fluid motor, and a fluid connection between the actuator and said source including a pressure limiting valve connected to the control side of the first valve for operation thereby.

14. A brake installation for aircraft having a retractable ground engaging wheel, comprising a source of fluid under pressure, a brake having a fluid pressure operated actuator, a fluid motor for retracting the ground engaging wheel, means providing a fluid connection between the source of fluid under pressure and the fluid motor including a valve operable to control the flow of fluid from the source to said fluid motor, a fluid connection between the actuator and said source including a pressure limiting valve connected to the control side of the first valve for operation by the latter, and a manually operable pressure producing device also having a fluid connection with the pressure limiting valve for operating the latter to control the brake actuator independently of the first valve.

LUDWIG A. MAJNERI.

REFERENCES CITED

The following references are of record in the file of this patent:

UNITED STATES PATENTS

| Number | Name | Date |
|---|---|---|
| 2,092,204 | Brown | Sept. 7, 1937 |
| 2,140,264 | Kingham | Dec. 13, 1938 |
| 2,244,317 | Rockwell | June 3, 1941 |
| 2,347,847 | Schnell | May 2, 1944 |